(12) United States Patent
Almgren et al.

(10) Patent No.: US 9,496,945 B2
(45) Date of Patent: Nov. 15, 2016

(54) RADIO REPEATER CONTROLLABILITY

(75) Inventors: Magnus Almgren, Sollentuna (SE); Per Skillermark, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 987 days.

(21) Appl. No.: 12/747,731

(22) PCT Filed: Dec. 14, 2007

(86) PCT No.: PCT/EP2007/063940
§ 371 (c)(1),
(2), (4) Date: Jun. 11, 2010

(87) PCT Pub. No.: WO2009/076993
PCT Pub. Date: Jun. 25, 2009

(65) Prior Publication Data
US 2010/0265839 A1    Oct. 21, 2010

(51) Int. Cl.
*H04B 7/14* (2006.01)
*H04B 7/155* (2006.01)

(52) U.S. Cl.
CPC ................. *H04B 7/15535* (2013.01)

(58) Field of Classification Search
None
See application file for complete search history.

(56) References Cited

U.S. PATENT DOCUMENTS

| | | | | |
|---|---|---|---|---|
| 5,623,496 A | * | 4/1997 | Sagi | 370/475 |
| 5,812,933 A | * | 9/1998 | Niki | 455/16 |
| 5,832,365 A | * | 11/1998 | Chen et al. | 455/15 |
| 5,987,304 A | | 11/1999 | Lätt | |
| 6,768,897 B1 | | 7/2004 | Suonvieri | |
| 8,032,146 B2 | | 10/2011 | Zhu et al. | |
| 2007/0015462 A1 | * | 1/2007 | Dean et al. | 455/15 |
| 2007/0184777 A1 | | 8/2007 | Tanoue | |
| 2008/0075178 A1 | | 3/2008 | Lappetelainen et al. | |
| 2010/0227620 A1 | | 9/2010 | Nadan et al. | |

FOREIGN PATENT DOCUMENTS

| | | |
|---|---|---|
| EP | 0681374 A1 | 11/1995 |
| EP | 0806847 A2 | 11/1997 |
| JP | 55147042 A | 11/1980 |
| JP | 58040938 A | 3/1983 |
| JP | 60250736 A | 12/1985 |

(Continued)

OTHER PUBLICATIONS

Ohtsuka Patent Office. Summary of Japanese Office Action issued Feb. 20, 2012, pp. 1-3, Tokyo, Japan.

*Primary Examiner* — Jae Y Lee
*Assistant Examiner* — Alan Lindenbaum
(74) *Attorney, Agent, or Firm* — Coats & Bennett, P.L.L.C.

(57) ABSTRACT

A radio repeater includes a first analyzer (22B) adapted to determine a time slot schedule. It also includes means (A1) for receiving control messages including uplink/downlink amplification requests for time slots in the determined schedule. A second analyzer (22A) is adapted to extract the uplink/downlink amplification requests from the received control messages. A control unit (24) is adapted to turn the uplink and downlink amplification on/off during the time slots depending on the extracted amplification requests.

24 Claims, 9 Drawing Sheets

(56) References Cited

FOREIGN PATENT DOCUMENTS

| | | |
|---|---|---|
| JP | 04109719 A | 4/1992 |
| JP | 07284156 A | 10/1995 |
| JP | 09298521 A | 11/1997 |
| JP | 11112399 A | 4/1999 |
| JP | 2000505263 A | 4/2000 |
| JP | 2001518739 A | 10/2001 |
| JP | 2005184104 A | 7/2005 |
| JP | 2005303613 A | 10/2005 |
| JP | 2007129670 A | 5/2007 |
| JP | 2009502056 A | 1/2009 |
| WO | 8910660 | 11/1989 |
| WO | 9917476 A2 | 4/1999 |
| WO | 2005122615 A1 | 12/2005 |
| WO | 2007011869 A1 | 1/2007 |
| WO | 2008004916 A1 | 1/2008 |
| WO | 2009076994 A1 | 6/2009 |

\* cited by examiner

RADIO REPEATER CONTROLLABILITY

TECHNICAL FIELD

The present invention relates generally to radio repeaters in radio networks, an in particular to methods and arrangements for improved controllability of the operation of such repeaters.

BACKGROUND

Deployment of radio repeaters is a possible means to enhance the performance of radio network coverage. A radio repeater is typically provided with two antennas placed in different positions. An incoming signal is received on one of the antennas, amplified and transmitted (forwarded) on the other antenna. The repeater antennas are typically used differently in the uplink and downlink. The antenna used to receive the downlink signal is also used to transmit the amplified uplink signal and vice versa.

In TDD (Time Division Duplex) radio networks uplink and downlink transmission is time multiplexed on the same carrier frequency. Thus, a radio repeater in a TDD network should not amplify the uplink and downlink at the same time. Instead the radio repeater must somehow determine which direction (uplink or downlink) is currently active and operate accordingly. A scenario in which the time slot usage (uplink or downlink) changes over time and between cells is especially challenging.

US 2007/0015462 A1 describes a method addressing this conflict based on receiving and analyzing the TDD schedule transmitted to the mobiles also at the repeaters. By extracting the time periods used for downlink and uplink from this schedule, it is possible to separate amplification in the two directions in time. However, a drawback of this method is that the repeaters will amplify signals to and from all mobiles or users, regardless of whether this is actually necessary. Not only does this waste power for connections that do not require amplification, it also creates unnecessary interference.

Although radio repeaters in FDD (Frequency Division Duplex) can transmit simultaneously in both the uplink and downlink (since the two links occupy different frequency bands), they still have the same drawback as radio repeaters in a TDD system, namely that they will amplify signals to and from all mobiles or users, regardless of whether this is actually necessary.

SUMMARY

In one or more of its embodiments, the present invention provides improved controllability of uplink and downlink amplification in radio repeaters, to reduce power consumption and generated interference.

Briefly, the base station determines radio links that require radio repeater amplification and forms radio repeater control messages including amplification requests for time slots associated with the determined radio links. These control messages are then transmitted. A repeater receiving these control messages can use them to control amplification in such a way that only radio links requiring amplification are amplified, thereby reducing both power consumption and generated interference.

BRIEF DESCRIPTION OF THE DRAWINGS

The invention, together with further objects and advantages thereof, may best be understood by making reference to the following description taken together with the accompanying drawings, in which.

DETAILED DESCRIPTION

This description will start by referring to radio repeaters in a typical TDD systems, where the downlink and uplink use the same frequency band, but not at the same time. Although the principles of the present invention described below may be used in other systems, a TDD system is well suited to illustrate the underlying problems and the suggested solution.

Figure 1:
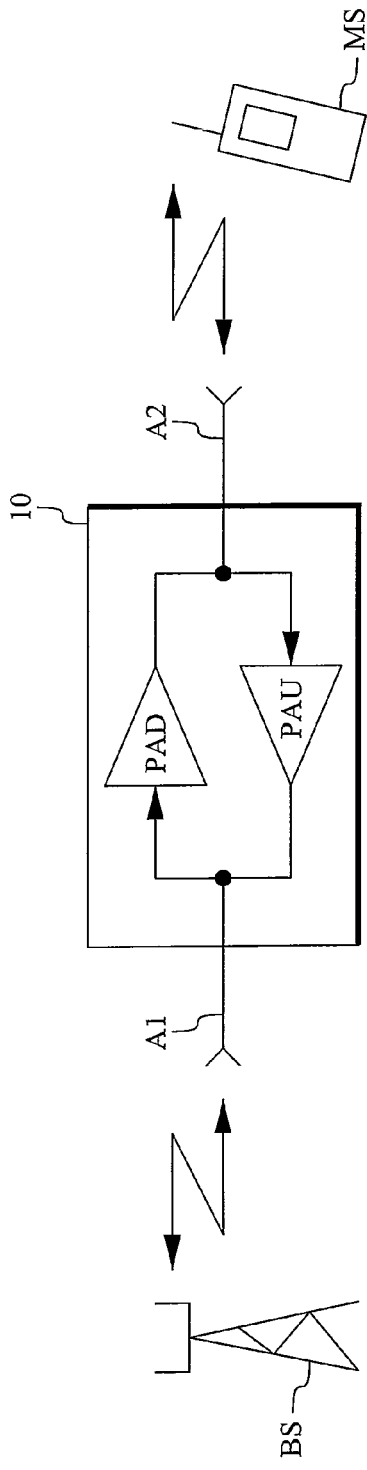
FIG. 1 is a simple block diagram of a radio network including a radio repeater.

FIG. 1 is a simple block diagram of a radio network including a radio repeater 10. The repeater includes a downlink (power) amplifier PAD for amplifying radio signals transmitted by a base station BS and received by a first antenna A1. The amplified signals are then retransmitted on a second antenna A2. Similarly, radio signals transmitted from a radio terminal MS are received by antenna A2, amplified by an uplink (power) amplifier PAU and retransmitted on antenna A1. A problem tackled by US 2007/0015462 A1 is how to make sure that the amplifiers PAD and PAU are active in the right timeslots, i.e., during downlink and uplink timeslots, respectively. The solution described in US 2007/0015462 A1 is based on detecting the TDD schedule transmitted by base station BS not only at the mobiles, but also at radio repeater 10. This schedule determines the time periods for the downlinks and the uplinks. By extracting this information radio repeater 10 is able to amplify and transmit in only one direction at a time.

The method described in US 2007/0015462 A1 is based on only timing information. This, however, implies that all radio links handled by the base station will be amplified by the radio repeaters, regardless of the actual need for amplification. This does not only waste power, but to make matters worse, the wasted power will also create interference in the radio network.

Figure 2:
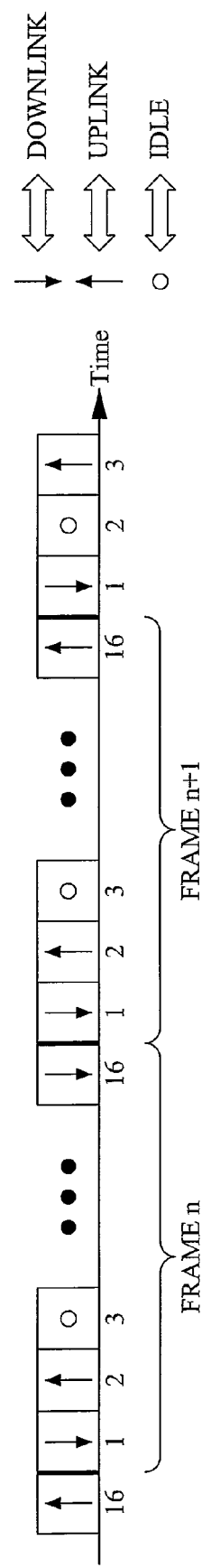
FIG. 2 is a time diagram illustrating the radio frame structure of an exemplary TDD frame.

An exemplary TDD radio frame structure is illustrated in FIG. 2. In this example a TDD radio frame includes 16 time slots, which can be used for uplink (↑) or downlink (↓) traffic or be idle (○). In the context of the present invention, idle does not necessarily mean that the time slot is inactive (does not include any information). It just means that the slot does not require any amplification by a radio repeater. The procedure for determining which slots that require amplification and which slots that are idle will be described in more detail below with reference to FIGS. 5 and 6.

Figure 3:
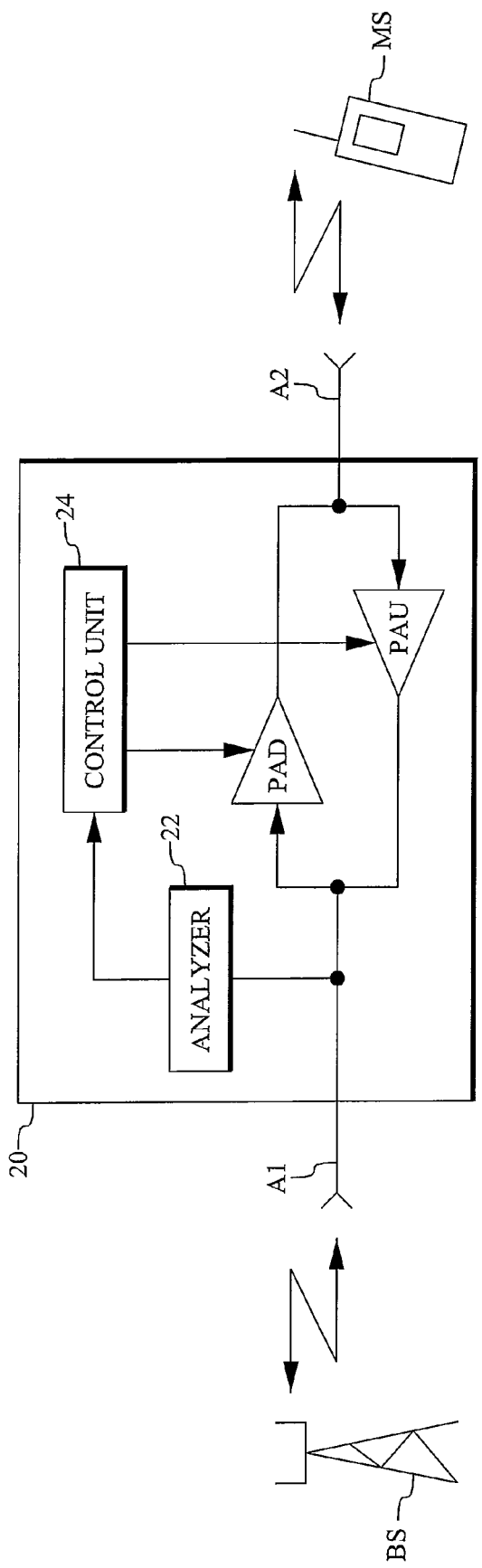
FIG. 3 is a simple block diagram of a radio network including an embodiment of a radio repeater in accordance with the present invention.
Figure 4:
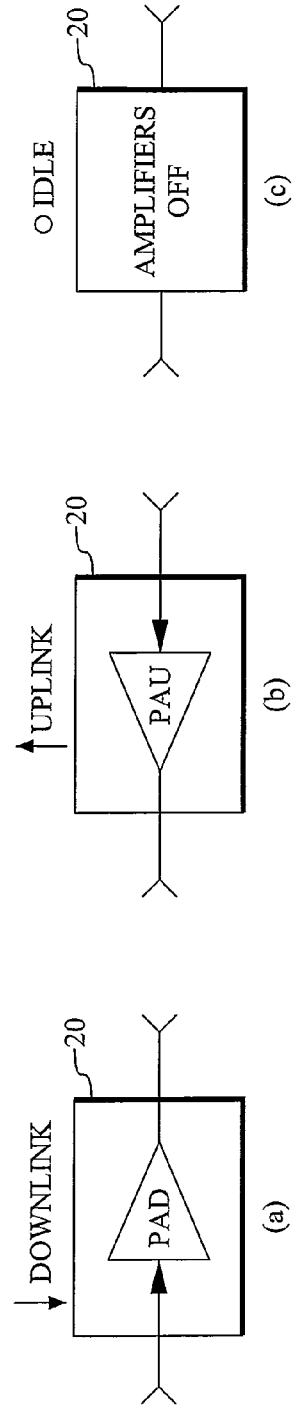
FIG. 4 illustrates different configurations of the radio repeater in FIG. 3.

FIG. 3 is a simple block diagram of a radio network including an embodiment of a radio repeater 20 in accordance with the present invention. The radio repeater receives control messages transmitted by base station BS. These control messages include amplification requests associated with the time slots in the TDD radio frames. In this way the signal from base station BS received on antenna A1 can be analyzed by an analyzer 22 that extracts the amplification requests and forwards them to a control unit 24 controlling the operation of amplifier PAD and PAU. Control unit 22 turns the amplifiers on or off depending on the amplification request for the corresponding time slot. The timing of the slots may be obtained by analyzer 22 by examining the TDD schedule that the base station broadcasts to the mobiles in the cell. The different configurations are illustrated in FIG. 4(a)-(c). For a downlink (↓) time slot only amplifier PAD will be turned on, as illustrated in FIG. 4(a). For an uplink (↑) time slot only amplifier PAU will be turned on, as illustrated in FIG. 4(b). For an idle (○) time slot both amplifiers may be turned off, as illustrated in FIG. 4(c).

Figure 5:
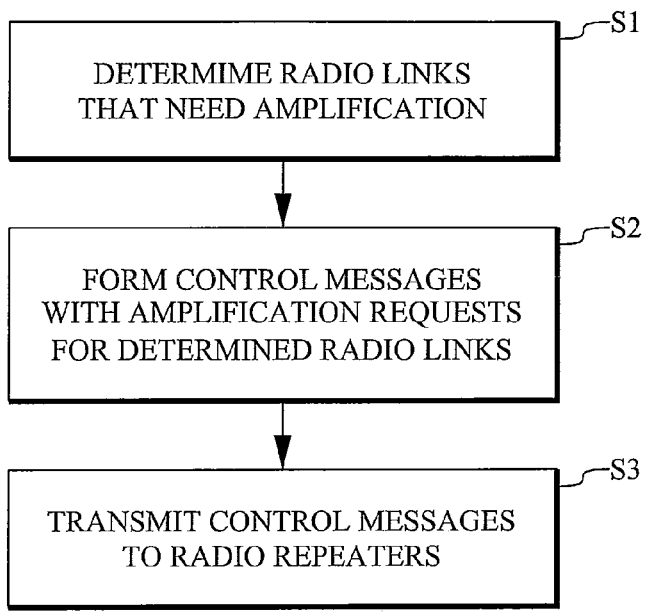
FIG. 5 is a flow chart illustrating the generation of radio repeater control signals at a base station.

FIG. 5 is a flow chart illustrating he generation of radio repeater control signals at a base station. In step S1 the base station determines radio links that require radio repeater amplification. Step S2 forms radio repeater control messages including amplification requests for time slots associated with the determined radio links. Step S3 transmits the radio repeater control messages to at least one radio repeater.

Figure 6:
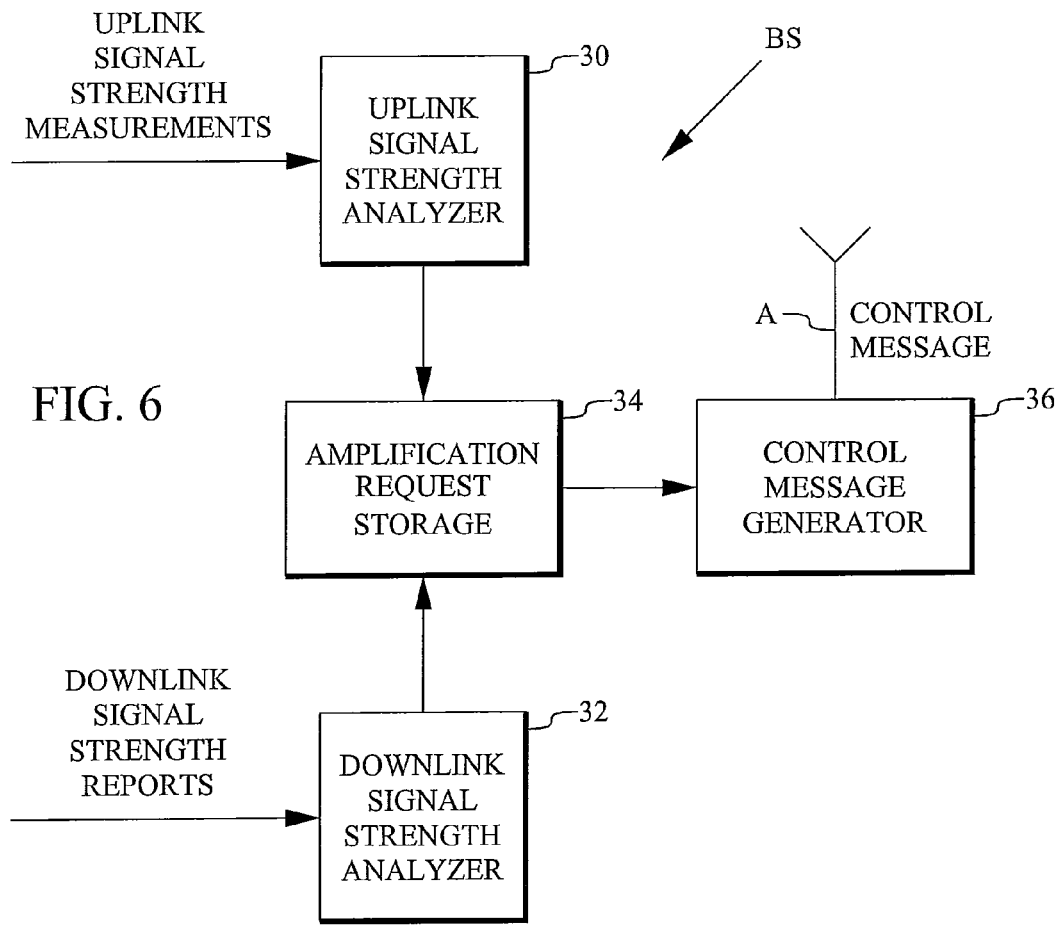
FIG. 6 is a block diagram of an embodiment of an arrangement for performing the method of FIG. 5.

FIG. 6 is a block diagram of an embodiment of an arrangement for performing the method of FIG. 5. Base station BS measures received signal strength on the uplink an analyzes the measurements in an uplink signal strength analyzer 30. Similarly, a downlink signal strength analyzer 32 analyzes downlink signal strength reports from the mobiles in the cell handled by the base station. Analyzers 30, 32 compare the signal strengths to thresholds (which may be equal or unequal for the uplink and downlink). If a signal strength falls below its associated threshold, the corresponding radio link requires amplification by a radio repeater, otherwise no amplification is required. Analyzers 30, 32 forward amplification requests to an amplification request storage 34 for the time slots that correspond to the radio links that require amplification. The time slot and amplification request information from storage 34 is forwarded to a control message generator 36 that forms the control message that is transmitted to the repeater or repeaters.

Figure 7:
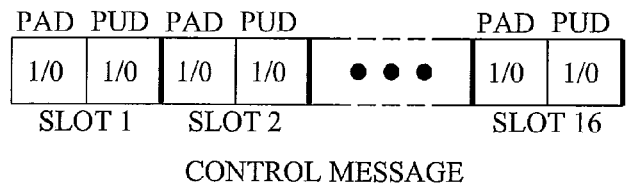
FIG. 7 illustrates an embodiment of a control message structure.

FIG. 7 illustrates an embodiment of a control message. In this embodiment 2 bits are allocated for each time slot. One bit controls the on/off state of amplifier PAD and the other bit controls the on/off state of amplifier PAU (for example "1" may indicate "amplifier on" and "0" may indicate "amplifier off"). In a TDD system typically the first time slot in each frame is always a downlink frame. Thus, the illustrated control message is preferably transmitted by a control channel included in this slot. The control message may be transmitted one frame ahead of the frame it is associated with to prepare the repeater for the amplification request, if any, that is applied in the next frame.

Figure 8:
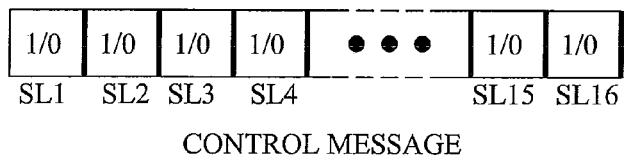
FIG. 8 illustrates another embodiment of a control message structure.
Figure 9:
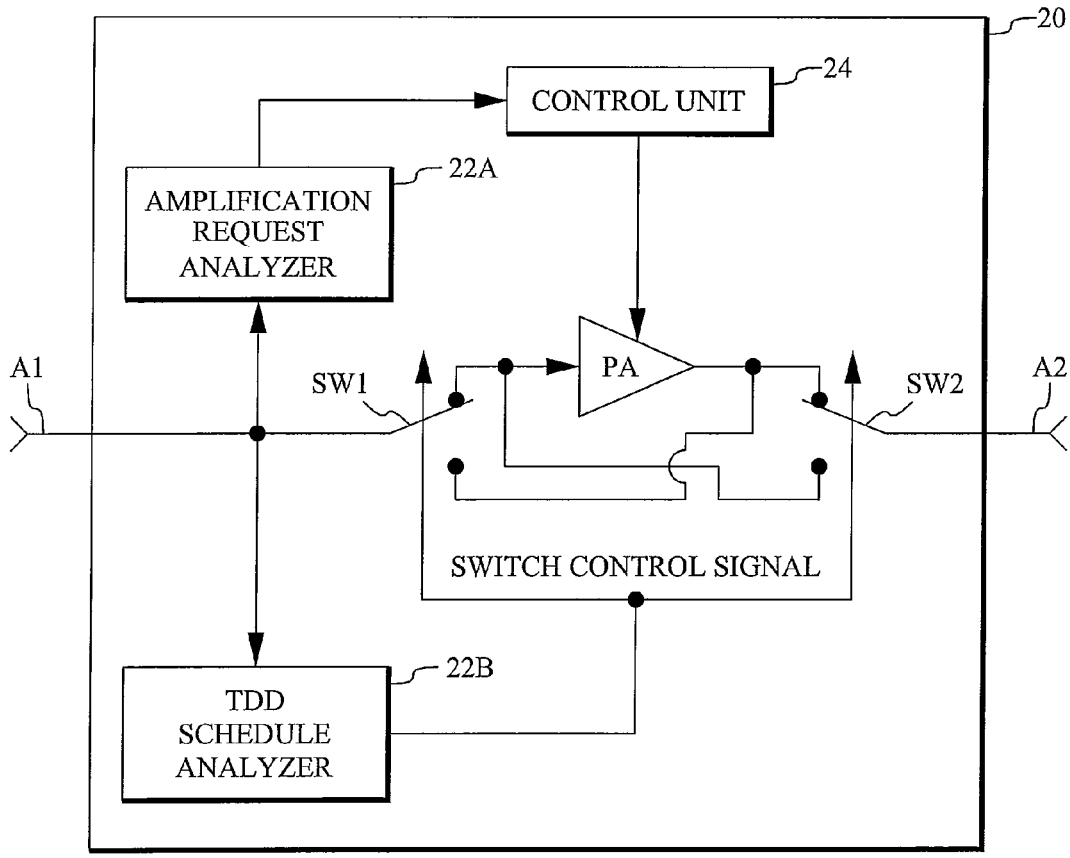
FIG. 9 is a block diagram of another embodiment of a radio repeater in accordance with the present invention.

FIG. 8 illustrates another embodiment of a control message. This message structure only spends one bit on each time slot (instead of two) to tell the repeater whether amplification should be on or off. A radio repeater suitable for this control message structure is illustrated in FIG. 9. As in the embodiment of FIG. 3 a part 22A of analyzer 22 extracts the amplification requests and forwards them to a control unit 24 controlling the amplification. In this embodiment there is only one amplifier PA that is controlled by two switches SW1, SW2 that reverse the amplification direction from uplink to downlink and vice versa. Since the radio repeater also receives the TDD schedule in antenna A1, a TDD schedule analyzer part 22B of analyzer 22 can determine the timing for the slots and operate switches SW1, SW2 accordingly.

Although the invention has so far been described with reference to a TDD network, the same principles may also be used in an FDD (Frequency Division Duplex) network. It is true that in FDD networks the uplink and downlink use different frequency bands and that the radio repeaters may amplify simultaneously on both. However, it may still be desirable to turn amplifiers on and off. For example, the base station may know that the reception quality at a radio terminal is acceptable without amplification. In such a case it would be wasteful to amplify the signal. Furthermore, amplification also would increase the interference level in the network.

The description so far has focused on the case where a link between a base station and a mobile terminal occupies the entire transmission bandwidth. This is e.g. the case for time division or code division multiple access (TDMA and CDMA, respectively). The basic principles of the invention can, however, also be used in systems where the available bandwidth during a timeslot is shared by means of frequency division multiple access (FDMA). FDMA may, for example, easily be accomplished in an OFDM (Orthogonal Frequency Division Multiplexing) network. With OFDM, the bandwidth comprises multiple sub-carriers and data symbols are transmitted in parallel over these sub-carriers. By assigning different sub-carriers to different links (users), the available bandwidth can be shared among several links. This is sometimes referred to as OFDMA (Orthogonal Frequency Division Multiple Access).

Figure 10:
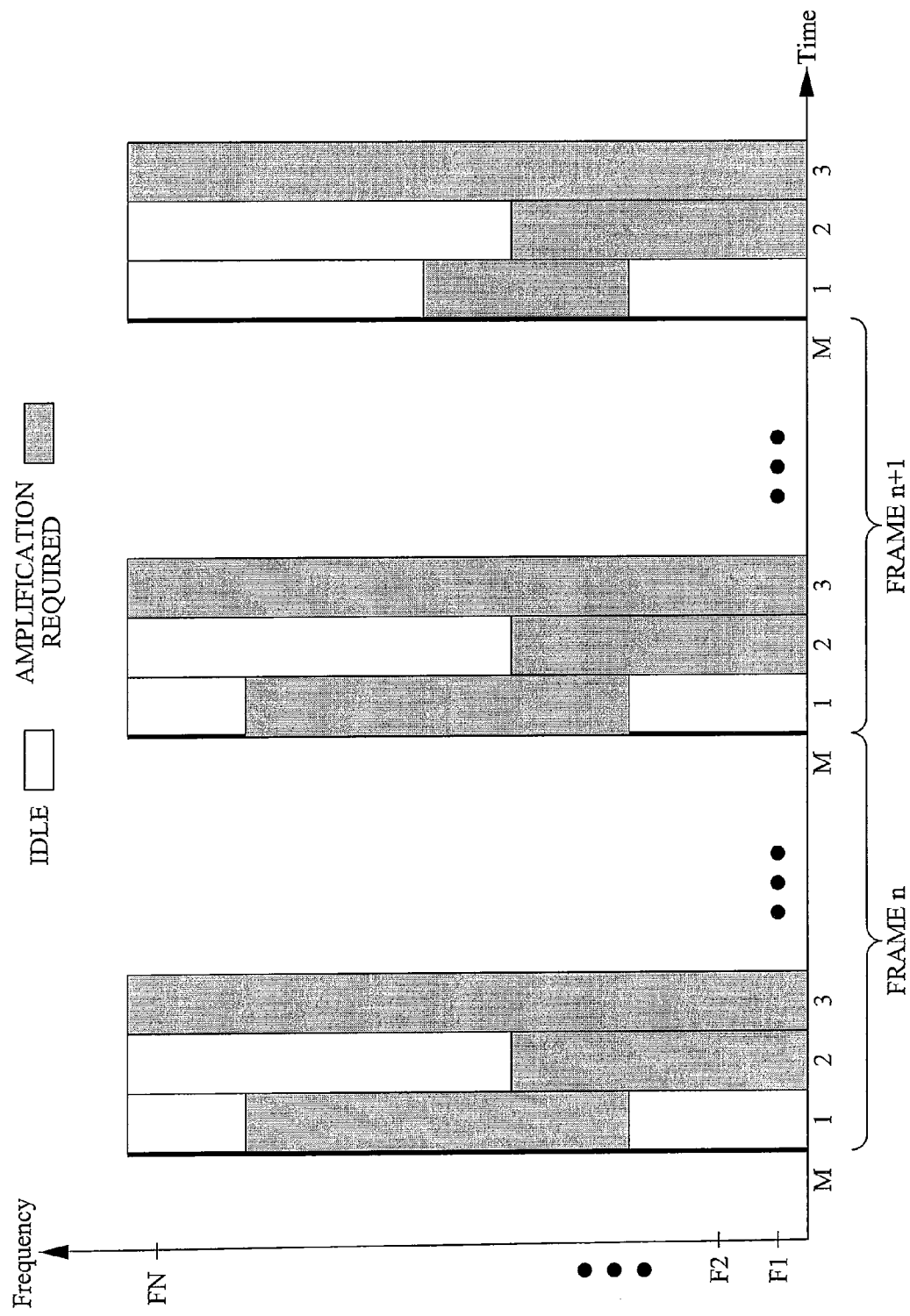
FIG. 10 is a time-frequency diagram illustrating the principles of a multi-carrier system.

In an FDMA system a time slot will include many sub-bands. However, the number of sub-bands allocated to a given radio link may occupy only a fraction of the available bandwidth, as illustrated in FIG. 10. It is noted that each time slot may include several radio links. In FIG. 10 the radio links indicated in gray require amplification and the idle radio links are white. It is also noted that the radio links may change bandwidth over time, as illustrated by slot 1 in the illustrated frames. In an OFDMA system, a sub-band typically includes several sub-carriers and a radio link may be allocated one or several sub-bands.

Figure 11:
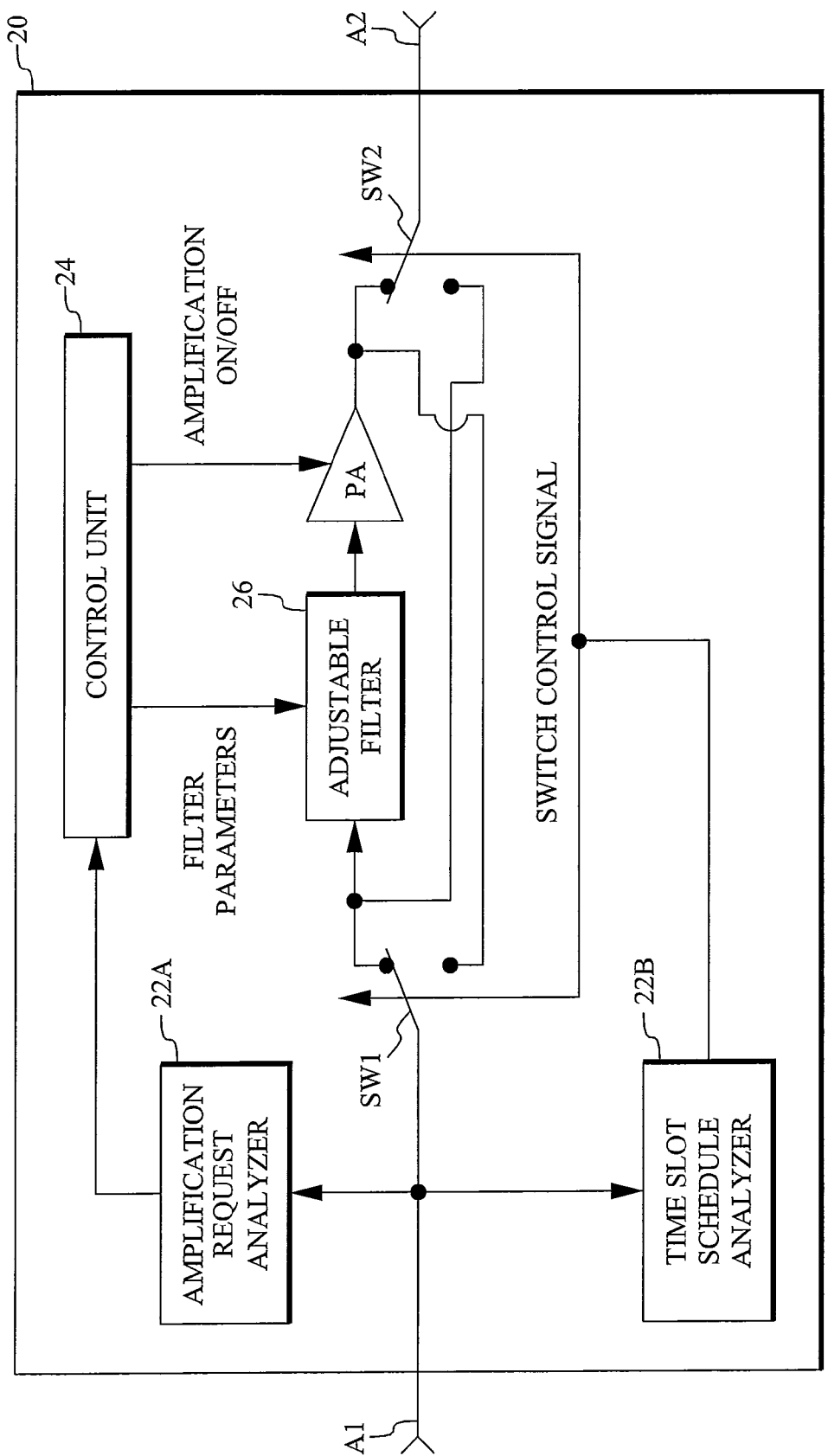
FIG. 11 is a block diagram of another embodiment of a radio repeater in accordance with the present invention.

Since a radio link in an FDMA multi-carrier system may use less than the entire available frequency band in a time slot, it is actually only the sub-band used by the link that should be amplified if amplification is required. This can be accomplished by filtering in the radio repeater, as illustrated in FIG. 11. The embodiment in FIG. 11 is similar to the embodiment in FIG. 9, but in this case an adjustable filter 26 is inserted in front of amplifier PA. Although amplifier PA may be turned on during a time slot, the actually amplified frequency band depends on the transfer function of the adjustable filter 26, the parameters of which are controlled by control unit 24. The filter parameters can be obtained by analyzing the amplification requests, as will be explained with reference to FIG. 12-16.

Figure 12:
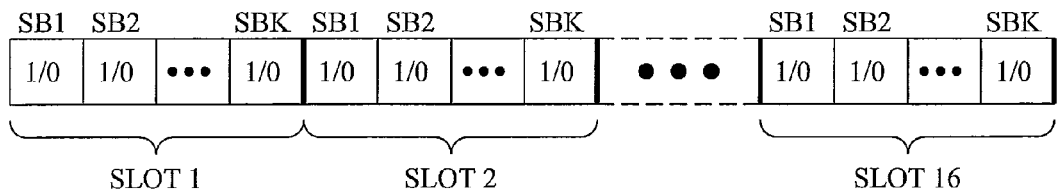
FIG. 12 illustrates an embodiment of a control message structure suitable for a multi-carrier system.

FIG. 12 illustrates an embodiment of a control message structure for a frame suitable for a multi-carrier system. Each sub-band SB1, SB2, ..., SBK is associated with one bit that specifies whether amplification by a radio repeater is requested or not. Although the frame length in this example is 16 time slots, both more and fewer slots are possible. In one extreme the frame length may be a single time slot.

Figure 13:
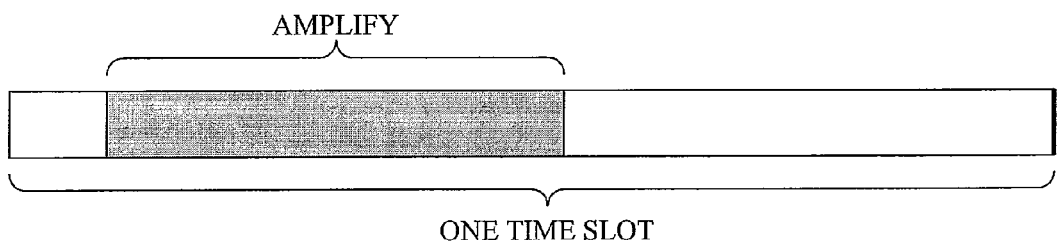
FIG. 13 illustrates an example of a control message associated with a time slot.

FIG. 13 illustrates an example of a control message associated with a time slot. The grey area represents the sub-bands of a radio link that require amplification by a radio repeater. The remaining (white) areas either require no amplification or contain no information, i.e. they are idle.

Figure 14:
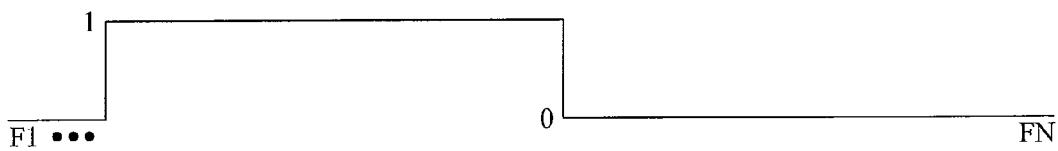
FIG. 14 illustrates an ideal filter transfer function for the control message of FIG. 13.

FIG. 14 illustrates an ideal filter transfer function for the control message of FIG. 13. In this case the filter is a band pass filter that passes the frequency band occupied by the sub-bands that require amplification unaltered to the amplifier and suppresses the remaining frequencies. In practice the filter characteristics outside the pass-band are not critical, as long as the signals are suppressed in these frequency bands to avoid generation of interference. In fact the filter characteristics inside the pass-band are also not critical. Thus, it is not necessary that the filter transfer function amplitude is flat inside the pass-band. Thus, any filter having a gradual decreasing filter transfer function amplitude from the pass-band to the stop-band is feasible. The general idea is to amplify the pass-bands more than the stop-bands.

Figure 15:
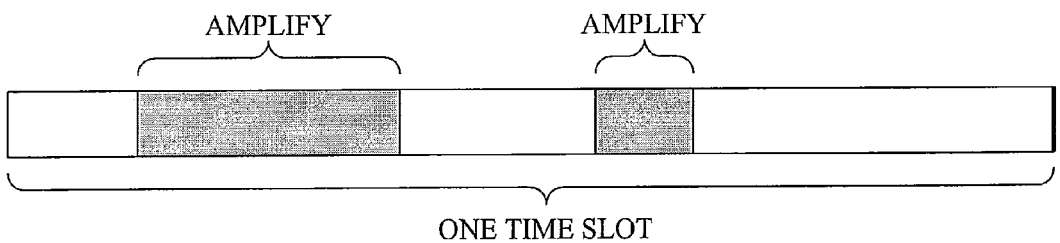
FIG. 15 illustrates another example of a control message associated with a time slot.
Figure 16:
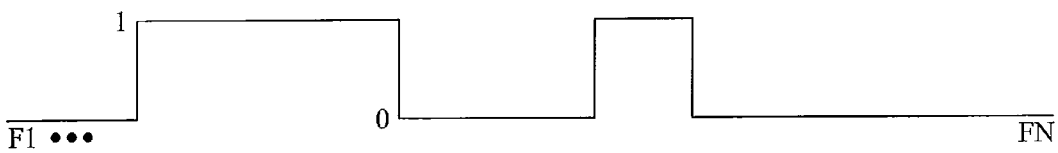
FIG. 16 illustrates an ideal filter transfer function for the control message of FIG. 15.

FIG. 15 illustrates another example of a control message associated with a time slot. In this case there are two radio links occupying different frequency bands that require amplification. FIG. 16 illustrates an ideal filter transfer function for the control message of FIG. 15.

Figure 17:
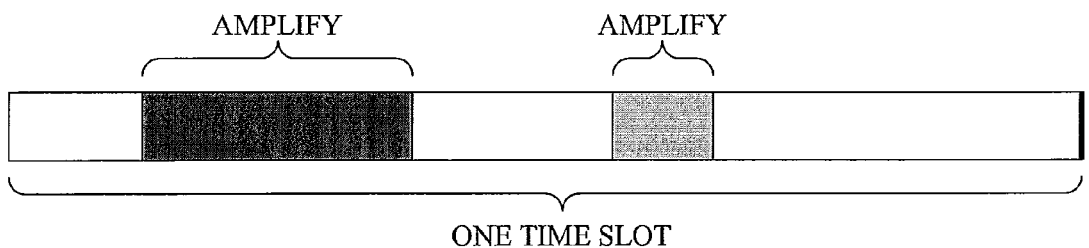
FIG. 17 illustrates a further example of a control message associated with a time slot.
Figure 18:
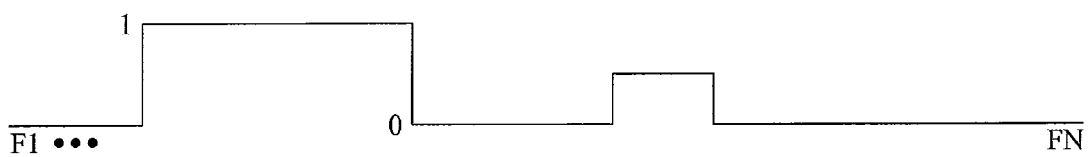
FIG. 18 illustrates an ideal filter transfer function for the control message of FIG. 17.

FIG. 17 illustrates another example of a control message associated with a time slot. In this case the radio link associated with the dark-gray frequency band requires more amplification than the radio link associated with the pale-gray frequency band. Such a differentiation may be obtained by allocating more than one bit for each sub-band in FIG. 12. FIG. 18 illustrates an ideal filter transfer function for the control message of FIG. 17. It is noted that the link requiring less amplification is partially suppressed relative to the link requiring full amplification. The idea behind this approach is to amplify radio links only to the degree that is actually required, thereby avoiding unnecessary power consumption and interference generation.

In the FDMA multi-carrier systems described so far it has been assumed that the sub-carriers associated with a radio link occupy one or several consecutive sub-bands. However, this is not strictly necessary. For example, in so called distributed multiple access systems a radio link is formed by sub-carriers that are spread over the available spectrum. The principles described above are still applicable to such systems, although the filtering of idle sub-carriers may seem more challenging. However, this is not really a problem, since the requirements on the suppression of idle sub-carriers is rather modest, as noted above. Thus, in more general terms a radio link of an FDMA multi-carrier system is formed by a subset of the available sub-carriers.

Figure 19:
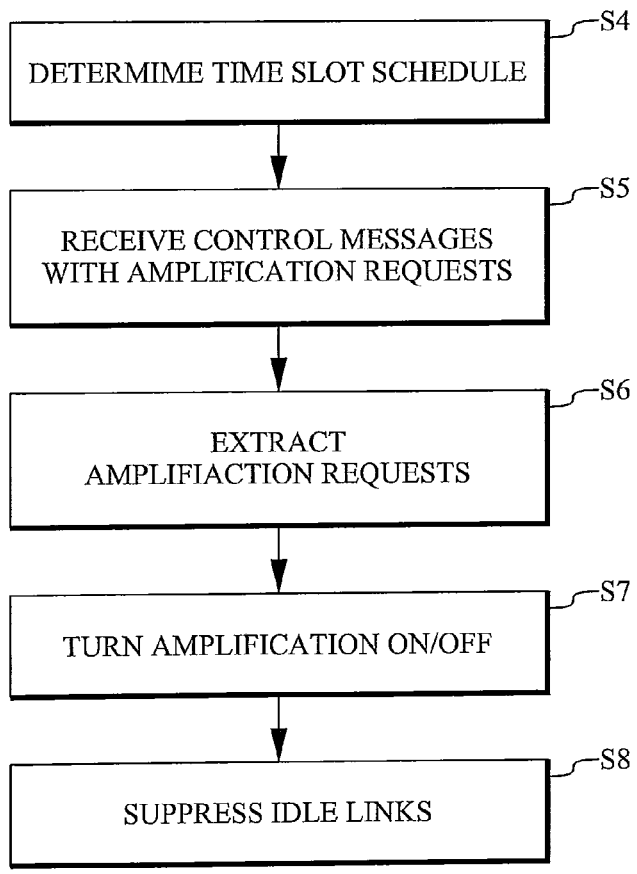
FIG. 19 is a flow chart illustrating the radio repeater control method in accordance with the present invention.

FIG. 19 is a flow chart summarizing the radio repeater control method in accordance with the present invention. Step S4 determines a time slot schedule. Step S5 receives control messages including amplification requests for time slots in the determined schedule. Step S6 extracts the amplification requests from the received control messages. Step S7 turns amplification on/off during the time slots depending on the extracted amplification requests. If the control messages identify sub-bands associated with radio links that require amplification, then a filtering step S8 can be added to suppress sub-carriers not belonging to sub-bands requiring amplification.

Figure 20:
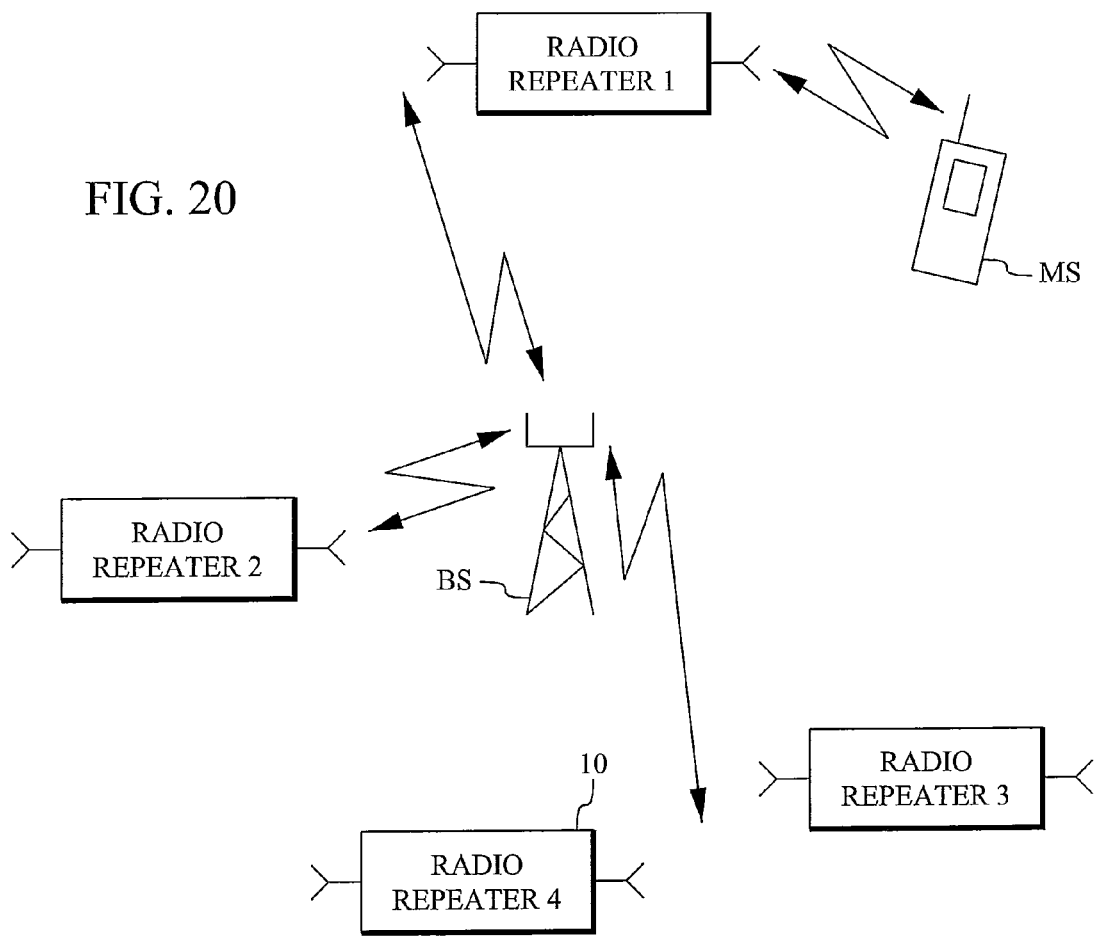
FIG. 20 illustrates a cell with several radio repeaters.

The above description has described techniques to prevent repeaters from amplifying signals to and from all mobiles, regardless of whether this is actually necessary. However, another drawback of the prior art is that all repeaters in a cell will amplify signals to and from a mobile even if some repeaters are far away from the mobile and will not enhance the communication quality. This situation is illustrated in FIG. 20. Here a base station BS broadcasts the same control messages to all radio repeaters 1-4, However, repeaters 2-4 are too far away from mobile MS to actually enhance the communication quality. Thus, in general it is not necessary that all repeater nodes amplify the signals.

Figure 21:
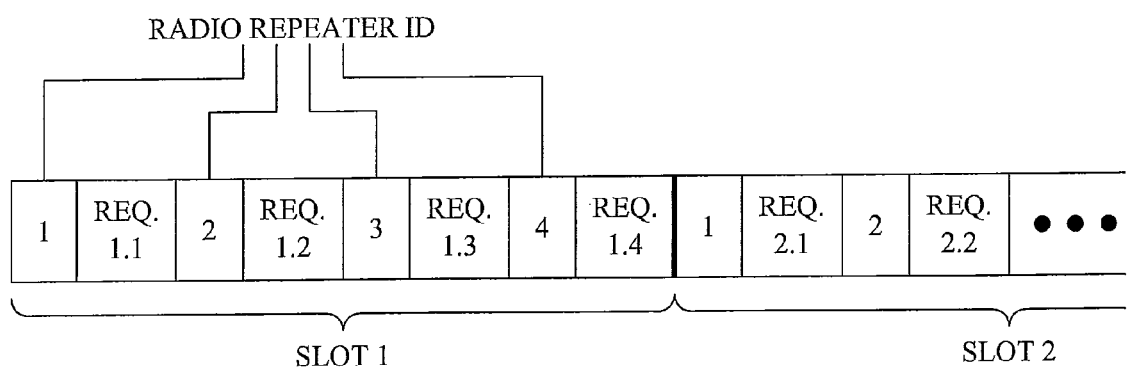
FIG. 21 illustrates another example of a control message structure.

The above problem may be solved by associating each radio repeater in a cell with a unique (within the cell) identification (ID). In this way individual amplification requests can be sent to each repeater. An example of a control message structure is illustrated in FIG. 21. In this structure each repeater is identified by its ID, and each ID is associated with its individual amplification request. A repeater only "listens" to its own ID to extracts its specific amplification requests and ignores all other requests. For example, in time slot 1 repeater 3 in FIG. 20 would only see amplification request 1.3, and in time slot 2 it would only see amplification request 2.3.

When the communication system has full control over the positions and addresses of the repeaters within its coverage area, the selection of repeaters to be activated can be based on the position information. Any location-related information that is achievable for the user terminal can then be used for selecting a proper repeater or set of repeaters. If an accurate position is available, such a selection becomes quite straight-forward. In other cases, direction information may be available. Moreover, other location-related information, such as any characteristic radio signal disturbances may be used for selection purposes.

When the system knows nothing about the position of the repeaters, not even if they at all exist, a procedure similar to the following example may be used. Assume that an address space of 16 repeater addresses is available. The signal quality is found to be low for communication with a certain user terminal, i.e. the need for repeater assistance is present. The base station transmits orders for activating all available repeaters for a time period Δt. The signal conditions were found to be improved by such a measure. A conclusion can be made that at least one of the repeaters was situated at a suitable location for assisting the user terminal. When the time period Δt has elapsed, new control signals are transmitted, which order repeaters No. 1-8 to continue to operate. The improvement in quality remains, which indicates that repeaters 9-16 did not contribute to the improvement. After another time period Δt, new control signals are transmitted, which order repeaters No. 1-4 to continue to operate. Now, the improvement disappeared. After another time period Δt, new control signals are transmitted, which instead order repeaters No. 5-6 to operate. The improvement is still missing. After still another time period Δt, new control signals are transmitted, which instead order repeater No. 7 to operate. Now, the improvement is back. A conclusion can be made, that repeater No. 7 was the appropriate one for the present situation. Note, that the system still does not know the exact position of repeater No. 7. The information that repeater No. 7 is beneficially used is now associated with all available signal condition information and location-related information and preferably also other information such as time of the day, type of user terminal and even subscriber identity and provided to an association algorithm for improving an experience data-base. The next time a user terminal presents similar conditions, the system may conclude that repeater No. 7 is a good candidate to assist.

The functionality of the various blocks in the described embodiments is typically obtained by one or more micro processors or micro/signal processor combinations and corresponding software.

It will be understood by those skilled in the art that various modifications and changes may be made to the present invention without departure from the scope thereof, which is defined by the appended claims.

The invention claimed is:

1. A method of generating radio repeater control signals at a base station that supports a plurality of radio links, each radio link corresponding to one of a plurality of supported wireless terminals, the method comprising:
   determining, based on analysis of signal strength in given time slots, a subset of the radio links which require radio repeater amplification;
   forming radio repeater control messages including amplification requests only for time slots associated with the determined subset of radio links; and
   transmitting the radio repeater control messages;
   wherein the subset of radio links includes some but not all of the radio links that are uplink radio links, or includes some but not all of the radio links that are downlink radio links.

2. The method of claim 1, wherein each amplification request includes individual on/off commands for amplification during a time slot.

3. The method of claim 1, wherein transmitting radio repeater control messages includes:
   transmitting requests for deactivation of amplification for idle ones of the radio links; and
   transmitting requests for deactivation of amplification for additional radio links;
   wherein each of the additional radio links corresponds to a same wireless terminal as one of the idle links;
   wherein the idle radio links are one of uplink radio links or downlink radio links, and the additional radio links are the other of uplink radio links or downlink radio links.

4. The method of claim 1, wherein the control messages identify sub-carriers associated with radio links requiring amplification.

5. The method of claim 4, wherein the control messages indicate the required degree of amplification.

6. The method of claim 1, wherein the control messages identify radio repeaters to which they pertain.

7. A base station operative to support a plurality of radio links, each radio link corresponding to one of a plurality of supported wireless terminals, and operative to generate radio repeater control signals for those radio links, the base station comprising one or more processing circuits configured as:
   a signal strength analyzer configured to determine, based on analysis of signal strength in given time slots, a subset of the radio links which require radio repeater amplification;
   a control message generator configured to form radio repeater control messages including amplification requests only for time slots associated with the determined subset of radio links; and
   a transmitter configured to transmit the radio repeater control messages;
   wherein the subset of radio links includes some but not all of the radio links that are uplink radio links, or includes some but not all of the radio links that are downlink radio links.

8. The base station of claim 7, wherein the control message generator is adapted to form an amplification request that includes individual on/off commands for amplification during a time slot.

9. The base station of claim 7, wherein the control message generator is adapted to:
   form control messages that include requests for deactivation of amplification for idle ones of the radio links; and
   form control messages for deactivation of amplification for additional radio links;
   wherein each of the additional radio links corresponds to a same wireless terminal as one of the idle links;
   wherein the idle radio links are one of uplink radio links or downlink radio links, and the additional radio links are the other of uplink radio links or downlink radio links.

10. The base station of claim 7, wherein the control message generator is adapted to form control messages that identify sub-carriers associated with radio links requiring amplification.

11. The base station of claim 10, wherein the control message generator is adapted to form control messages indicating the required degree of amplification.

12. The base station of claim 7, wherein the control message generator is adapted to form control messages identifying radio repeaters to which they pertain.

13. A method of operating a radio repeater to selectively provide amplification for a plurality of radio links between a base station and a plurality of wireless terminals, wherein each of the radio links corresponds to one of the plurality of wireless terminals, the method comprising:
   determining a time slot schedule;
   receiving control messages from the base station including amplification requests only for time slots associated with a subset of the radio links that have been determined, based on analysis of signal strength in given time slots, to require radio repeater amplification;
   extracting the amplification requests from the received control messages; and
   controlling amplification during the time slots in accordance with the extracted amplification requests;
   wherein the subset of radio links includes some but not all of the radio links that are uplink radio links, or includes some but not all of the radio links that are downlink radio links.

14. The method of claim 13, further including individually turning on/off amplification during a time slot.

15. The method of claim 13, further including:
   deactivating amplification for idle ones of the radio links; and
   deactivating amplification for additional radio links;
   wherein each of the additional radio links corresponds to a same wireless terminal as one of the idle links;

wherein the idle radio links are one of uplink radio links or downlink radio links, and the additional radio links are the other of uplink radio links or downlink radio links.

16. The method of claim 13, further including:
identifying sub-carriers associated with radio links requiring amplification from the control messages; and
amplifying the identified sub-carriers and suppressing sub-carriers not requiring amplification.

17. The method of claim 16, further including identifying a required degree of amplification from the control messages.

18. The method of claim 13, further including determining whether a control message includes an identifier pertaining to a radio repeater receiving the message.

19. A radio repeater operative to selectively provide amplification for a plurality of radio links between a base station and a plurality of wireless terminals, wherein each of the radio links corresponds to one of the plurality of wireless terminals, comprising one or more processing circuits configured as:
a first analyzer configured to determine a time slot schedule;
a receiver configured to receive from the base station control messages including amplification requests only for time slots associated with a subset of the radio links that have been determined, based on analysis of signal strength in given time slots, to require radio repeater amplification;
a second analyzer configured to extract the amplification requests from the received control messages; and
a control unit configured to control amplification during the time slots in accordance with the extracted amplification requests;
wherein the subset of radio links includes some but not all of the radio links that are uplink radio links, or includes some but not all of the radio links that are downlink radio links.

20. The radio repeater of claim 19, wherein the control unit is adapted to individually turn on/off amplification during a time slot.

21. The radio repeater of claim 19, wherein the control unit is adapted to:
deactivate amplification for idle ones of the radio links; and
deactivate amplification for additional radio links;
wherein each of the additional radio links corresponds to a same wireless terminal as one of the idle links;
wherein the idle radio links are one of uplink radio links or downlink radio links, and the additional radio links are the other of uplink radio links or downlink radio links.

22. The radio repeater of claim 19, wherein:
the second analyzer is adapted to identify sub-carriers associated with radio links requiring amplification from the control messages; and
an adjustable filter is adapted to suppress sub-carriers not requiring amplification.

23. The radio repeater of claim 22, wherein the adjustable filter is adapted to partially suppress identified sub-carriers to match a required degree of amplification.

24. The radio repeater of claim 19, wherein the second analyzer is adapted to determine whether a control message includes an identifier pertaining to the radio repeater.

* * * * *